July 8, 1958 R. L. FRANK 2,842,744

BALANCED MODULATOR CIRCUIT

Filed Dec. 30, 1955 2 Sheets-Sheet 1

INVENTOR

ROBERT L. FRANK

BY R. J. Craddock

ATTORNEY

INVENTOR
ROBERT L. FRANK
BY R. J. Craddock
ATTORNEY

United States Patent Office 2,842,744
Patented July 8, 1958

2,842,744

BALANCED MODULATOR CIRCUIT

Robert L. Frank, Great Neck, N. Y., assignor to Sperry Rand Corporation, a corporation of Delaware Application December 30, 1955, Serial No. 556,621

4 Claims. (Cl. 332—47)

This invention relates to modulators, and more particularly, is concerned with a diode-switch type of double balanced modulator-demodulator circuit.

Various double balanced full wave modulator circuits, characterized by the fact that neither of the input signals appear as components of the output signal, have been heretofore proposed. One of the best known of these circuits, is the so-called "ring modulator" circuit, such as described in Radiation Laboratory Series, vol. 19, page 410 (see Fig. 11.20c) McGraw-Hill, 1949 The "ring modulator" circuit can be operated as a detector to provide full wave double-balanced operation with a single-ended output, i. e., an output signal derived across a pair of terminals one of which is at ground potential. However, the ring modulator has the disadvantage that the output is transformer loaded, so that at higher frequencies or where it is desired to operate the circuit at a high impedance level to limit the input power requirements or for other reasons, the stray capacitance to ground of the transformer windings limits the frequency response. Another disadvantage of conventional circuits is the difficulty of balancing the circuit to reduce any input signal components in the output to a minimum.

It is the general object of this invention to avoid and overcome the foregoing disadvantages and objections to the prior art practices by the provision of an improved diode-switch type of balanced modulator circuit.

Another object of this invention is the provision of a balanced modulator providing double-balanced full wave operation with a single-ended output in which there is no transformer loading in the output.

Another object of this invention is the provision of a balanced modulator which can be easily provided with separate adjustments to minimize the input signal components in the output.

Another object of this invention is to provide a double balanced modulator having a single-ended output which may be designed to operate without any transformers, according to one modification of the invention.

These and other objects of the invention which will become apparent as the description proceeds are achieved by providing a balanced modulator circuit comprising four diodes connected to a common output terminal, two of the diodes being connected to pass current toward the terminal and the other two diodes being connected to pass current away from the terminal. First and second signals, such as a modulated signal and a carrier signal, are applied to phase inverting means, such as a pair of transformers having center-tapped secondary windings, to produce first and second phases 180° displaced for each of the two input signals. The first phase of the first signal is added to the first phase of the second signal, as by connecting the respective halves of the two secondary windings in series, and the added signals are connected to the output terminals through a first one of the diodes. Similarly the second phase of the first signal is added to the second phase of the second signal and connected to the output terminal through the other diode having the same direction of current conduction. The first phase of the first signal is added to the second phase of the second signal and the second phase of the first signal is added to the first phase of the second signal, the added signals being coupled respectively to the remaining pair of diodes. The input signals applied to the phase inverting means and the output signal derived from the output terminal may have a common ground reference.

For a better understanding of the invention reference should be had to the accompanying drawings, wherein.

Figure 1:
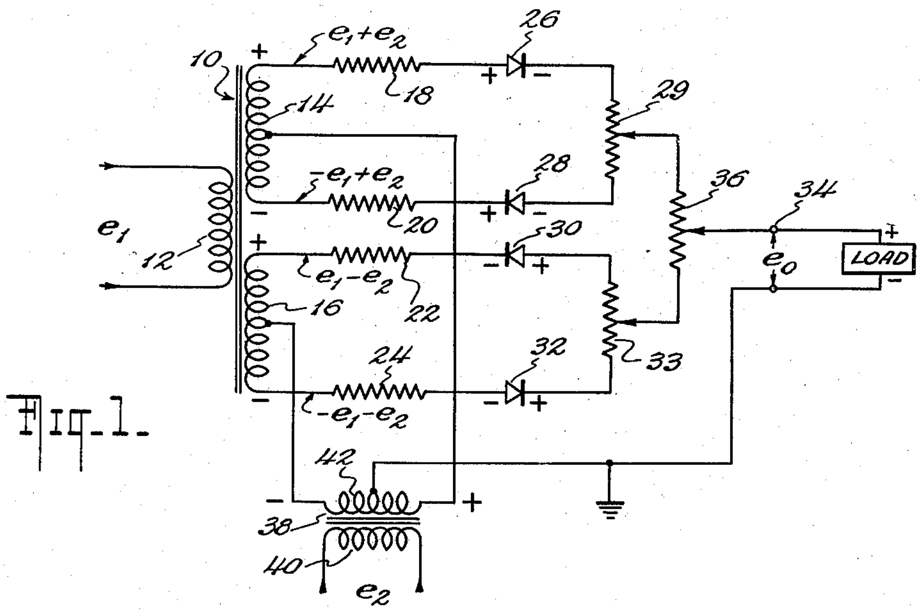
Fig. 1 is a schematic diagram of one embodiment of a balanced modulator circuit incorporating the features of the present invention.

Referring to Fig. 1, the numeral 10 indicates generally an input transformer having a primary winding 12 across which is applied an input signal $e_1$. The transformer 10 includes a pair of center-tapped secondary windings 14 and 16. Where the circuit of Fig. 1 is to be operated as a modulator, for example, the input signal $e_1$ may be the modulating signal. Where the circuit of Fig. 1 is to be operated as a demodulator, for example, the input signal $e_1$ may be an amplitude modulator carrier type of signal.

Connected to the respective ends of the secondary windings 14 and 16 of the input transformer 10 through series current-limiting resistors 18, 20, 22, and 24 are four nonlinear conductive elements, such as crystal diodes, copper oxide rectifiers, thermionic diodes, or the like, indicated generally at 26, 28, 30 and 32. The diodes 26 and 28 are connected to a common output terminal 34 through a balancing potentiometer 29 and through one portion of a balancing potentiometer 36, while the diodes 30 and 32 are connected through a balancing potentiometer 33 to the common output terminal 34 through the remaining portion of the balancing potentiometer 36. The diodes 26 and 28 are arranged to conduct in opposite directions with respect to the output terminal 34. Similarly the diodes 30 and 32 are arranged to conduct in opposite directions relative to the output terminal 34.

A second input or reference transformer 38 has a primary winding 40 across which is applied a second input voltagt $e_2$. The signal $e_2$ may be a carrier or reference voltage and is gnerally of substantially greater amplitude than the maximum amplitude of the signal $e_1$. The transmformer 38 has a center-tapped secondary winding 42, the ends of the winding 42 being respectively coupled to the center taps of the secondary windings 14 and 16 of the transformer 10 to add the voltages across the respective secondary windings in series. The center tap of the secondary winding 42 of the transformer 38 is connected to ground.

In considering the operation of the circuit of Fig. 1 as a demodulator or detector, the voltages $e_1$ and $e_2$ have the same frequency, and are assumed for the present to be in phase, with the instantaneous potentials having the polarities indicated on the schematic diagram of Fig. 1. It will be seen that the voltage appearing across the right half of the secondary winding 42 of the transformer 38 is added to the voltage appearing across the upper half of the secondary winding 14 of the transformer 10 so that the potential appearing at the diode 26 is the sum of the two input voltages $e_1$ and $e_2$. Similarly, it will be seen that the instantaneous potential at the diode 28 with the polarities as indicated will be $-e_1+e_2$, the potential at the diode 30 will be $e_1-e_2$, and the potential at the diode 32 will be $-e_1-e_2$. Since, as stated above, the voltage $e_2$ is larger than $e_1$, the resulting potentials appearing across the respective diodes 26, 28, 30 and 32 are such that the diodes 28 and 32 are blocked and no current flows in these branches. However, current does flow through the diodes 26 and 30. It will be seen that the net instantaneous current through the load is the difference between the currents flowing respectively through the diodes 26 and 30. Since the larger potential appears across the diode 26 in series with the load, the net current flow through the load is toward ground and the instantaneous potential across the load is as indicated.

On the next half cycle of the voltages $e_1$ and $e_2$, the instantaneous polarities are all reversed from the indicated polarities. Accordingly, the diodes 28 and 32 conduct while the diodes 26 and 30 are blocked. Again the net current through the load is the difference between the currents flowing respectively through the diodes 28 and 32. Because the larger potential appears across the diode 32 in series with the load, the net current flow again is toward ground and the instantaneous potential across the load is the same as during the previous half cycle of the voltages $e_1$ and $e_2$. Thus a voltage having a full-wave rectified type of voltage waveform appears across the load in response to two in-phase A.-C. input signals of the same frequency.

If the phase of one input signal is reversed relative the phase of the other input signal, with $e_2$ larger in magnitude than $e_1$, the diodes 26 and 32 and the diodes 28 and 32 conduct as pairs an alternate half cycles just as described above. However, the larger potential now appears across the diodes 28 and 30 on respective half cycles. As a result the net current flow through the load is reversed. Therefore it will be seen that reversing the relative phase between the input signals reverses the polarity of the voltage across the load.

Figure 2:
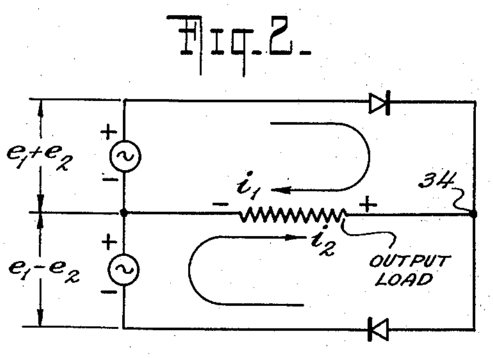
Fig. 2 is a simplified schematic diagram useful in explaining the operation of the circuit of Fig. 1. as a detector.

Referring to Fig. 2 an equivalent partial circuit of the detector of Fig. 1 is shown wherein a potential $e_1+e_2$ passes a current through one diode and the output load and similarly a voltage $e_1-e_2$ passes a current $i_2$ through the other diode and the output load. It will be apparent that the current $i_1$ will be greater than the current $i_2$ so that a net voltage drop appears across the output load, the output potential across the load being equal to $2e_1$.

Figure 3:
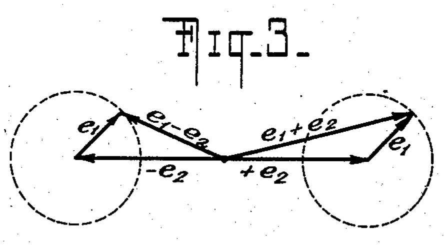
Fig. 3 is a vector diagram showing the relationship of the various voltages appearing in the circuit of Fig. 1 when it is utilized as a phase detector.

The vector diagram of Fig. 3 shows how the resultant of the input signal $e_1$ and reference voltage $e_2$ is obtained. If it is assumed that the amplitude of the input signal $e_1$ remains constant, it can be seen from Fig. 3 how the vector sum and difference of the signals $e_1$ and $e_2$ may be determined. For instance, as the phase of the signal $e_1$ varies through 360° (as shown by the dotted circles) with respect to the reference voltage $e_2$, the magnitude of the two resultants vary. As long as the two resultants are unequal, a net voltage appears across the output load. It will be seen that if the magnitude of the signal $e_1$ varies, the magnitude of the resultants also vary. However, if the signals $e_1$ and $e_2$ are 90° out of phase, the two resultants will be equal in magnitude and hence no voltage will appear across the output load. It will further be seen that maximum output voltage across the load is obtained when the signals $e_1$ and $e_2$ are in phase or 180° out of phase with respect to each other. By reversing the relative phase between the two signals $e_1$ and $e_2$, the polarity of the signal across the output load will be reversed.

Due to differences in impedance of the transformer windings, stray capacitance, and leakage resistance, the diodes of the circuit of Fig. 1 are not perfectly balanced.

There is a leakage of both of the voltages $e_1$ and $e_2$ through the diodes into the output. To reduce the leakage produced by these and unbalances, the balance potentiometers 29, 33 and 36 may be provided. The potentiometers 29 and 33 are adjusted with the signal $e_2$ removed until the potential across the output is at a minimum. The potentiometer 36 is adjusted with the signal $e_1$ removed until the potential across the output is a minimum. The resistors 18, 20, 22 and 24 may be provided to increase the circuit impedance and thereby limit the currents drawn by the modulator circuit from the sources $e_1$ and $e_2$ When the circuit of Fig. 1 is operated as a modulator, $e_1$ may be considered as the modulating voltage at some lower frequency and $e_2$ may be considered as the carrier signal at some higher frequency. In such case, the diodes 26 and 30 and the diodes 28 and 32 alternately conduct as pairs on alternate half cycles of the carrier signal. Since the instantaneous polarities produced by the input signal $e_1$ reverse at a much lower frequency, the polarity across the load reverses on each half cycle of the carrier, with the instantaneous magnitude being proportional, in the manner described above, to the magnitude of instantaneous input signal $e_1$.

Figure 4:
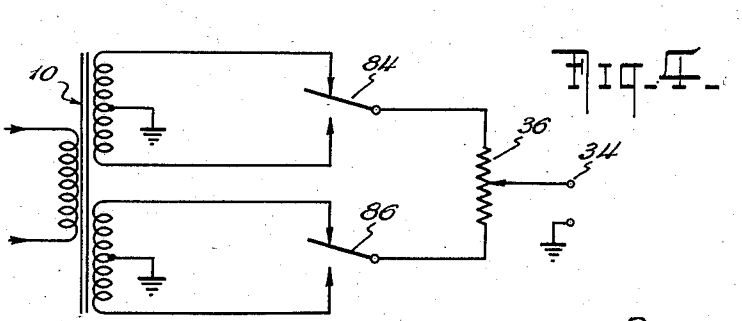
Fig. 4 is a simplified schematic diagram useful in explaining the operation of the circuit of Fig. 1 as a modulator.
Figure 5:
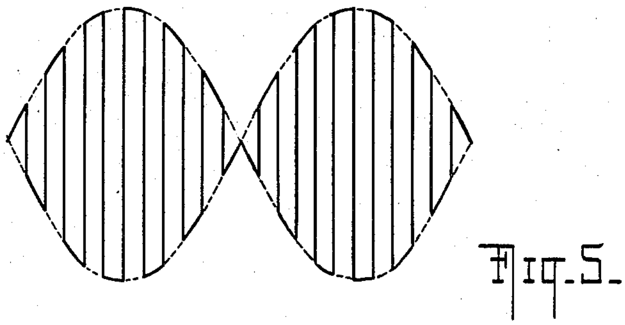
Fig. 5 is a plot of the waveform of the modulator output.

The equivalent circuit is shown in Fig. 4. The double-throw switches 84 and 86 are equivalent to the diodes 26 and 28 and the diodes 30 and 32 respectively. With the switches operated at the carrier frequency, opposite phases of the secondary voltages of the transformer 10 are alternately connected across the load. The resulting waveform across the load is shown in Fig. 5.

Figure 6:
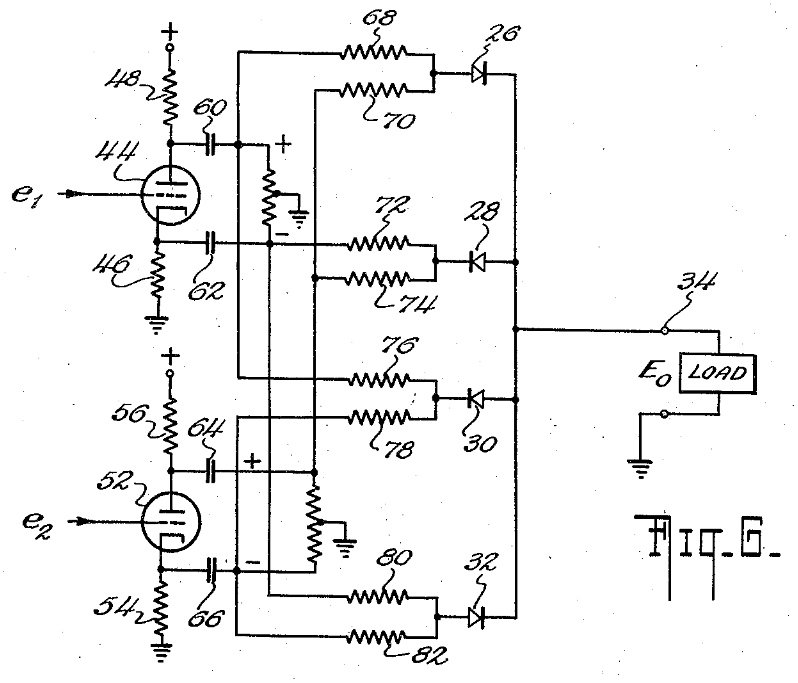
Fig. 6 is a schematic diagram of a modified version of a balanced modulator circuit incorporating the features of the present invention.

Referring to Fig. 6, an alternative embodiment of the modulator circuit is shown in which the two phases of the signals $e_1$ and $e_2$ are added by resistors, rather than by transformer windings in series as in the circuit of Fig. 1. Thus in the circuit of Fig. 4, signals of opposite phase are derived from the first input signal $e_1$ by means of an electronic phase inverter including a triode 44 having equal resistors 46 and 48 connected to the cathode and plate respectively.

Similarly the input voltage $e_2$ is coupled to an electronic phase inverter which includes a triode 52 having equal resistors 54 and 56 connected to the cathode and plate respectively. Voltages proportional to $e_1$ but of opposite phase relative to each other are derived respectively from the plate and cathode of the triode 44 through respective coupling capacitors 60 and 62. Similarly voltages proportional to $e_2$ but of opposite phase relative to each other are derived respectively from the plate and cathode of the triode 52 by means of respective coupling capacitors 64 and 66.

As in the circuit of Fig. 1, four diodes 26, 28, 30 and 32 are connected to an output terminal 34. Whit the polarities as indicated, two instantaneous voltages proportional to $e_1+e_2$ are added and applied to the diode 26 by means of a pair of resistors 68 and 70 connected respectively to the coupling capacitors 60 and 64. Similarly, a voltage proportional to $e_1-e_2$ is applied to the diode 28 by means of resistors 72 and 74 connected respectively to the coupling capacitors 62 and 64. A pair of resistors 76 and 78 add the voltages $e_1$ and $-e_2$ to the diode 30 while resistors 80 and 82 add the voltages $-e_1$ and $-e_2$ to the diode 32. Thus the relationship of the voltages as added and applied to the respective diodes is identical to that of Fig. 1. The operation of the circuit of Fig. 6 as a modulator or demodulator consequently may be analyzed in the same manner as the operation of the circuit of Fig. 1 and is equivalent in all respects. The circuit of Fig. 6 has the advantage that it avoids the use of any transformers on the input, but suffers the disadvantages that the voltage produced across the output load is reduced by the voltage drop necessarily appearing across the adding resistors 68, 70, 72, 74, 76, 78, 80, and 82.

From the above description it will be seen that the various objects of the invention have been achieved by the provision of a diode-switch type of circuit that operates as a modulator, a demodulator, or phase detector depending on the type of input signals applied. The circuit provides full wave double-balanced operation, yet gives a single-ended output with direct coupling between the output and the diodes. Since no transformer windings appear in the output circuit, the circuit can be operated into a high impedance load at high frequencies by avoiding the shunting effect of stray capacitance which normally is introduced by an output transformer.

While for the sake of clarity the circuit operation has been described as $e_2$ being the reference or carrier signal and $e_1$ as the modulated or modulating signal of smaller magnitude then $e_2$, the circuit operates equaly as well with the $e_1$ and $e_2$ inputs interchanged and having any relative magnitude. While center-tapped secondaries have been shown and described in Fig 1, the various voltages can be derived from separated secondary windings for each phase and the various secondary windings added in series with the respective diodes to form the four circuits in series with the load. Since each diode and transformer winding is in series, it will be appreciated that their relative positions in the series circuit can be rearranged under some circumstances withuot changing the operation of the circuit. Also, as is well known in the modulator art, it may be desirable under some circumstances to use one of the input terminals as an output, with the output terminal used as one of the inputs.

Since many changes could be made in the above construction and many apparently widely different embodiments of this invention would be made without departing from the scope thereof, it is intended that all matter contained in the above description or shown in the accompanying drawings shall be interpreted as illustrative and not in a limiting sense.

What is claimed is:

1. A balanced modulator type circuit comprising an input transformer including a pair of center-tapped secondary windings, a reference voltage transformer having a single center-tapped secondary winding, the ends of the secondary winding of the reference voltage transformer being connected respectively to the center-taps of the two secondary windings of the input transformer, and a plurality of diodes respectively connecting the ends of the two secondary windings of the input transformer to a common output terminal, the diodes of each of the pairs of diodes associated respectively with the two secondary windings being connected to conduct current in the opposite directions through the output terminals whereby said windings are separated from said output terminal by said diodes.

2. Apparatus as defined in claim 1 further including resistive means in series with the respective secondary windings of the input transformer.

3. A single-ended modulator circuit comprising first, second, third, and fourth unilaterally conductive two-terminal elements, means for coupling one terminal of each of said elements to a first common output terminal, the first and fourth elements being arranged to conduct current toward said first output terminal and the second and third elements being arranged to conduct current away from said first output terminal, means for producing alternating current signals of opposite phase in response to a first input signal, means for producing alternating current signals of opposite phase in response to a second input signal, means for applying one phase of the first signal to the other terminals of the first and third elements, means for applying the other phase of the first signal to the other terminals of the second and fourth elements, means for applying one phase of the second signal to the other terminals of the first and second elements, and means for applying the other phase of the second signal to other terminals of the third and fourth elements whereby each phase of said alternating current signals is applied to said first output terminal by a respective one of said unilaterally conductive elements.

4. Apparatus as defined in claim 3 wherein each said means for producing alternating current signals of opposite phase includes a phase inverter circuit.

References Cited in the file of this patent

UNITED STATES PATENTS

| | | |
|---|---|---|
| 2,545,250 | Appert | Mar. 13, 1951 |
| 2,695,988 | Gray | Nov. 30, 1954 |